US006946528B2

(12) United States Patent
Domine et al.

(10) Patent No.: US 6,946,528 B2
(45) Date of Patent: Sep. 20, 2005

(54) HOT MELT ADHESIVES

(75) Inventors: Joseph D. Domine, Humble, TX (US); Jean M. Tancrede, Katy, TX (US); Sally Q. Pugh, Baker, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/466,454

(22) PCT Filed: Jan. 18, 2002

(86) PCT No.: PCT/US02/01281

§ 371 (c)(1),
(2), (4) Date: Feb. 3, 2004

(87) PCT Pub. No.: WO02/060993

PCT Pub. Date: Aug. 8, 2002

(65) Prior Publication Data

US 2004/0198897 A1 Oct. 7, 2004

Related U.S. Application Data

(60) Provisional application No. 60/263,000, filed on Jan. 19, 2001, and provisional application No. 60/263,002, filed on Jan. 19, 2001.

(51) Int. Cl.$^7$ ............................. C08F 2/00; C08G 85/00
(52) U.S. Cl. ..................... 526/64; 524/272; 524/275; 524/277; 526/86; 526/87; 526/229; 526/329; 526/319; 428/36.92; 428/348
(58) Field of Search ................. 526/64, 86, 87, 526/229, 319, 329; 524/272, 275, 277, 281, 100, 289, 333, 343, 487; 428/36.92, 348

(56) References Cited

U.S. PATENT DOCUMENTS

| | | | | |
|---|---|---|---|---|
| 2,953,551 A | * | 9/1960 | White | 526/64 |
| 3,884,786 A | * | 5/1975 | Domine et al. | 524/487 |
| 4,135,044 A | * | 1/1979 | Beals | 526/64 |
| 4,404,299 A | | 9/1983 | Decroix | 524/77 |
| 4,434,261 A | | 2/1984 | Brugel et al. | 524/109 |
| 4,816,306 A | | 3/1989 | Brady et al. | 428/36.92 |
| 4,874,804 A | | 10/1989 | Brady et al. | 524/100 |
| 5,095,046 A | | 3/1992 | Tse | 523/206 |
| 5,141,809 A | * | 8/1992 | Arvedson et al. | 428/349 |
| 5,401,791 A | | 3/1995 | Milks | 524/270 |
| 5,500,472 A | | 3/1996 | Liedermooy et al. | 524/272 |
| 5,604,268 A | | 2/1997 | Randen et al. | 523/164 |
| 6,297,309 B1 | | 10/2001 | Bauduin et al. | 524/476 |

FOREIGN PATENT DOCUMENTS

DE 2 340 743 4/1974

* cited by examiner

Primary Examiner—Tatyana Zalukaeva
(74) Attorney, Agent, or Firm—Andrew B. Griffis; Maria C. Walsh

(57) ABSTRACT

The invention provides a hot melt adhesive composition including a tubular reactor copolymer of ethylene and 5 to 20 mol % of comonomer units derived from an alkyl acrylate or alkyl methacrylate, wherein the copolymer has a melt index of at least 300 g/10 min. The alkyl group of the alkyl acrylate or alkyl methacrylate can be a linear or branched $C_1$ to $C_{12}$ group, particularly n-butyl. If desired, the hot melt adhesive can further include tackifiers, waxes, antioxidants and other desired additives. The hot melt adhesive composition shows improved heat resistance and favorable properties, such as has a shear adhesion fail temperature of at least 80° C., without the need to use high melting waxes. The invention further provides articles such as cartons, cases, trays, bookbindings or disposables including the hot melt adhesive compositions.

19 Claims, 4 Drawing Sheets

HOT MELT ADHESIVES

CROSS REFERENCE TO RELATED APPLICATIONS

This application is a National Stage Application of International Application No. PCT/US02/01281, filed Jan. 18, 2002, which claims the benefit of Provisional Application No. 60/263,000, filed Jan. 19, 2001 and Provisional Application No. 60/263,002, filed Jan. 19, 2001.

FIELD OF THE INVENTION

The present invention is directed to hot melt adhesive compositions. In particular, the invention provides copolymers of ethylene and alkyl acrylates or alkyl methacrylates suitable for use as hot melt adhesives, or as components of hot melt adhesive formulations. The invention further provides articles of manufacture using such hot melt adhesives, such as cartons, cases, trays, books, assembled products, and disposables.

BACKGROUND

Hot melt adhesives are widely used in industry for various applications. Typical applications include product assembly, packaging such as case, carton or tray forming, and in glue sticks. Hot melt adhesives in use today are generally based on ethylene vinyl acetate copolymers (EVA) and low molecular weight polyethylene homopolymers (LMPE). Desirable properties in a hot melt adhesive include: (a) suitability for high temperature end use; (b) low temperature flexibility; (c) low viscosity; and (d) thermal stability, to name but a few. Conventional hot melt adhesives, however, typically lack one or more such properties. LMPE-based hot melt formulations can have good elevated temperature end use characteristics, but are undesirably brittle at low temperatures. EVA copolymers are prone to char, skin or gel when exposed to elevated temperatures in the presence of air. In addition, EVA-based adhesives generally have poor elevated temperature performance.

Ethylene acrylate copolymers available commercially today, such as ethylene methyl acrylate or ethylene n-butyl acrylate copolymers, can be formulated to give hot melt adhesives that have good thermal stability and low temperature flexibility, but these formulations still lack in elevated temperature performance. High temperature performance can be improved by addition of high melting point waxes, but such waxes significantly increase the cost of the adhesive. Thus, it would be desirable to have adhesive formulations with good elevated and low temperature performance, good adhesion to a variety of substrates, and excellent thermal stability, without the need for large amounts of expensive, high melting point waxes.

SUMMARY

It has been surprisingly found that ethylene alkyl acrylate or alkyl methacrylate copolymers made in a tubular reactor can show significantly higher peak melt temperatures than similar copolymers made in an autoclave reactor, while still maintaining a similar low temperature glass transition, for good low temperature flexibility. These surprising properties, as well as others described more fully below, provide for hot melt adhesive compositions having superior properties over a wider range of temperatures, compared to conventional polymers such as ethylene vinyl acetate, autoclave-produced ethylene methyl acrylate or ethylene n-butyl acrylate, or low molecular weight polyethylene homopolymers. In case, carton, and tray forming and closing applications, these adhesive compositions can achieve high temperature end use without the need for expensive high melting waxes. The novel copolymers are also suitable for glue stick formulations where improved heat resistance is difficult to achieve with conventional polymers. Further, the novel copolymers can be formulated as adhesive compositions that can be used in bookbinding and product assembly applications, and are readily sprayable for nonwoven applications.

In one embodiment, the present invention provides a hot melt adhesive composition including a tubular reactor copolymer of ethylene and 5 to 20 mol % of comonomer units derived from an alkyl acrylate or alkyl methacrylate, wherein the copolymer has a melt index of at least 300 g/10 min. The alkyl group of the alkyl acrylate or alkyl methacrylate can be a linear or branched, $C_1$ to $C_{12}$ group, particularly n-butyl. If desired, the hot melt adhesive can further include tackifiers, waxes, antioxidants and other desired additives. The hot melt adhesive composition shows improved heat resistance and favorable properties, such as a shear adhesion fail temperature of at least 80° C., and adhesive melt viscosity of less than 2200 cps at 180° C.

In another embodiment, the present invention provides a low-tackifier hot melt adhesive composition including a tubular reactor copolymer of ethylene and 5 to 15 mol % of comonomer units derived from an alkyl acrylate or alkyl methacrylate, and less than 20% by weight of a tackifier, based on the total weight of the composition. The composition can further include waxes, antioxidants, and other desired additives.

In another embodiment, the present invention provides a hot melt adhesive composition including a copolymer of ethylene and at least 5 mol % of comonomer units derived from an alkyl acrylate or alkyl methacrylate, wherein the copolymer has a melt index of from 1 to 10,000 g/10 min, and a maximum peak melting temperature of at least 100° C. The copolymer shows increased heat resistance as characterized by a temperature required to melt 50% of the copolymer of at least 80° C., a temperature required to melt 80% of the copolymer of at least 100° C., a temperature required to melt 100% of the copolymer of at least 110° C. The hot melt adhesive composition can further include tackifiers, waxes, antioxidants, and other additives as desired. The hot melt adhesive composition has a shear adhesion fail temperature of at least 80° C., and an adhesive melt viscosity of less than 2200 cps at 180° C.

In another embodiment, the present invention provides articles such as cartons, cases, trays, bookbindings, or disposables including the hot melt adhesive compositions described herein.

In another embodiment, the present invention provides a glue stick comprising the hot melt adhesive compositions described herein.

BRIEF DESCRIPTION OF THE DRAWINGS

FIG. 1 (prior art) shows the peak melting temperature obtained by differential scanning calorimetry (DSC) for commercially available ethylene vinyl acetate (EVA) and ethylene methyl acrylate (EMA) copolymers, as a function of the comonomer content.

FIG. 2 (prior art) shows the peak melting temperature obtained by differential scanning calorimetry (DSC) for commercially available ethylene vinyl acetate (EVA) copolymers, as a function of the copolymer melt index.

FIG. 3 shows a differential scanning calorimetry (DSC) profile of a tubular reactor-produced ethylene n-butyl acrylate copolymer, Resin 5, used to prepare invention adhesives and a conventional autoclave reactor-produced ethylene n-butyl acrylate copolymer, EN 33900.

DETAILED DESCRIPTION

Figure 1:
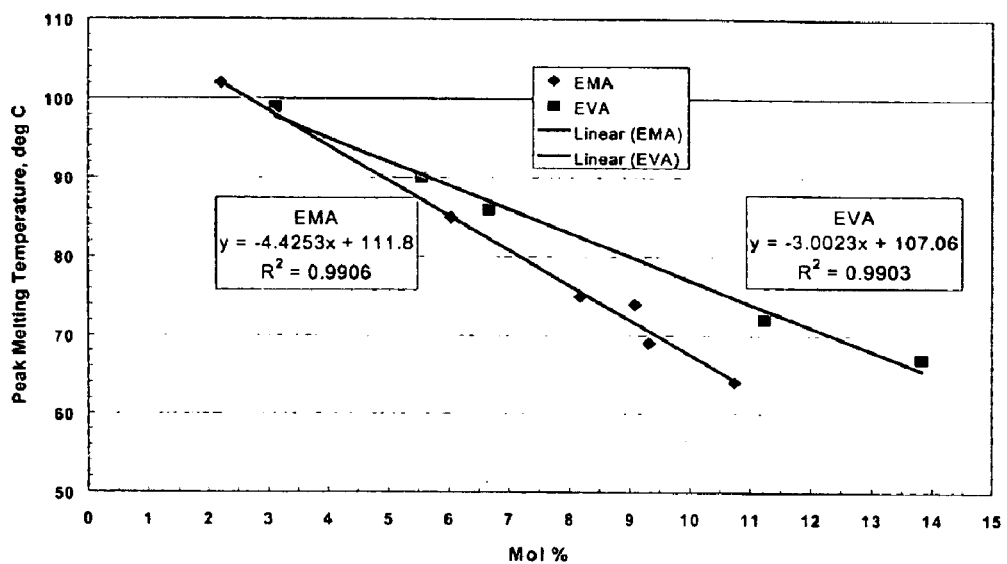
Figure 2:
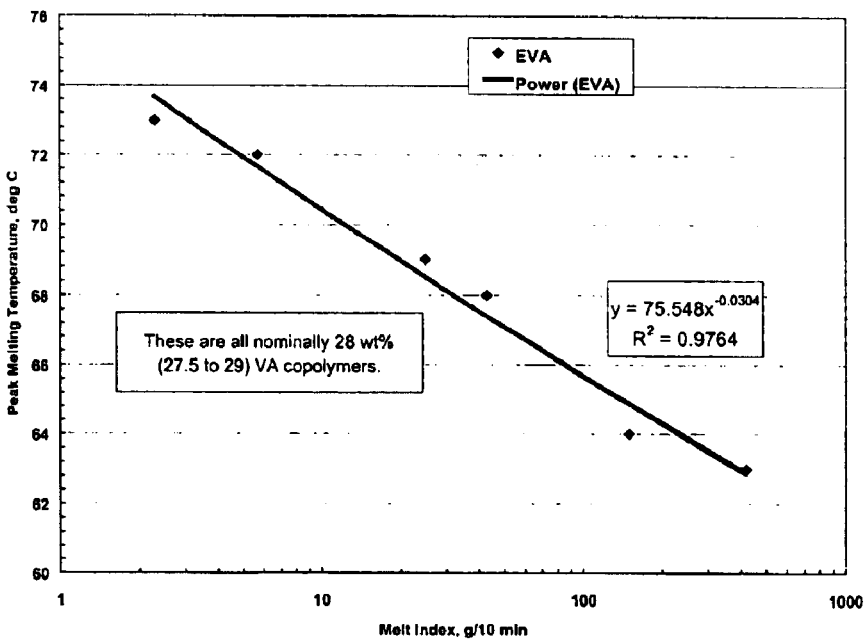

Ethylene Alkyl Acrylate or Alkyl Methacrylate Copolymer

The copolymers of the present invention are copolymers of ethylene and at least one comonomer, wherein the comonomer is an alkyl acrylate or alkyl methacrylate ester. Suitable comonomers include the acrylic acid and methacrylic acid esters of C1 to C12 linear or branched alcohols, preferably acrylic acid and methacrylic acid esters of C1 to C8 linear or branched alcohols. Other examples of alkyl acrylate or alkyl methacrylate esters suitable for use as comonomers include methyl acrylate, ethyl acrylate, n-butyl acrylate, iso-butyl acrylate, t-butyl acrylate, n-hexyl acrylate, 2-ethylbutyl acrylate, and 2-ethylhexyl acrylate, as well as the acrylic acid esters of neo-isomers of C5 to C12 alcohols. N-butyl acrylate is also a suitable comonomer.

The copolymer can contain at least 5 mol %, preferably from 5 mol % to 20 mol %, 5 mol % to 15 mol %, 6 mol % to 14 mol %, or 7 mol % to 12 mol % comonomer derived units. In one embodiment, the copolymer contains a lower limit of at least 5 mol % or at least 6 mol % or at least 7 mol % comonomer-derived units, and an upper limit of 20 mol % or 14 mol % or 12 mol % comonomer derived units, with ranges from any lower limit to any upper limit being contemplated.

That is the copolymer can contain from 5–12; 5–14; 5–15; 5–20; 6–12; 6–14; 6–15; 6–20; 7–12; 7–14; 7–15 or 7–20 mol % of comonomer derived units.

The alkyl acrylate or methacrylate ester monomers can be used alone or in mixtures. Monomers other than ethylene and the alkyl acrylate or alkyl methacrylate esters can optionally be included. These additional monomers include vinyl esters, such as vinyl acetate, and monomers such as acrylic acid, methacrylic acid, or partial esters of maleic acid, and carbon monoxide. Thus, as used herein the term "copolymer" includes polymers made from two, three, or more comonomers.

In some embodiments, the copolymer includes ethylene; an alkyl acrylate or alkyl methacrylate, or mixtures thereof; and a comonomer having a reactivity ratio $r_2$ relative to ethylene of 2 or less, or 1.5 or less, or 1.2 or less, or about 1. Exemplary comonomers having such a reactivity ratio include vinyl esters, such as vinyl acetate, vinyl formate, and vinyl propionate. Reactivity ratios $r_2$ are well known in the art, and are described, for example, in *Encyclopedia of Polymer Science and Engineering*, Vol. 6, p.401–403 (1986) (John Wiley, New York); and *Encyclopedia of Chemical Technology*, 4th Ed., Vol. 17, p. 718–719 (1996) (John Wiley, New York).

The ethylene alkyl acrylate or alkyl methacrylate copolymers used in the invention can be produced in a high pressure tubular reactor. High pressure tubular reactors for producing ethylene alkyl acrylate or alkyl methacrylate ester copolymers are well known; see, e.g., U.S. Pat. No. 2,953,551. The present invention is not limited to resins made in any specific tubular reactor design, operating pressure or temperature variables, or initiator system, provided that the tubular reactor is capable of injection of initiator into the reaction stream at least two, at least three, or at least four locations along the reaction tube.

As used herein, the term "tubular ethylene alkyl acrylate or alkyl methacrylate copolymer" means a copolymer produced in such a multi-initiator-injection, high pressure tubular reactor.

The tubular reactor may be an elongated jacketed tube or pipe, usually in sections or blocks, of suitable strength and diameter. A typical tubular reactor can have a length-to-diameter-ratio of from about 1000 to 1 to about 60,000 to 1. The tubular reactor is typically operated at pressures from about 1000 to 3500 bar, although pressures higher than 3500 bar can be used if desired.

The temperature maintained in the reactor is variable, and is primarily controlled by and dependent on the specific initiator system employed. Temperatures are usually within the range of about 100° C. to 350° C., and can vary in the different reaction zones.

An example of a high pressure tubular reactor suitable for use in producing the ethylene alkyl acrylate or alkyl methacrylate copolymers of the invention is shown in U.S. Pat. No. 4,135,044. If the reactor shown in U.S. Pat. No. 4,135,044 is used, it is preferred useful to operate the reactor without cold side-streams.

The polymerization reaction is carried out in the presence of free radical initiators. Such initiators are well known in the art. Specific non-limiting examples of such free radical initiators include oxygen; peroxide compounds such as hydrogen peroxide, decanoyl peroxide, t-butyl peroxy neodecanoate, t-butyl peroxypivalate, 3,5,5-trimethyl hexanoyl peroxide, diethyl peroxide, t-butyl peroxy-2-ethyl hexanoate, t-butyl peroxy isobutyrate, benzoyl peroxide, t-butyl peroxy acetate, t-butyl peroxy benzoate, di-t-butyl peroxide, t-amyldecanoate, t-amylpivalate, t-amylperoctoate and 1,1,3,3-tetramethyl butyl hydroperoxide; alkali metal persulfates, perborates and percarbonates; and azo compounds such as azo bis isobutyronitrite. Organic peroxides function as initiators. Mixtures of such initiators can also be used, and different initiators and/or different initiator mixtures can be used in the different initiator injections. The initiator can be added to the reaction stream in any suitable manner, such as neat, dissolved in a suitable solvent, and/or mixed with the monomer or comonomer feed stream.

As noted above, an initiator is injected into the reaction stream at least two, at least three, or least four locations. In one embodiment, monomers and comonomers are introduced into the tubular reactor at a single location, so that injection of additional initiator at second, third, fourth, and subsequent locations, is not accompanied by injection of any additional monomer or comonomer.

The reaction can also be carried out in the presence of conventional modifiers, such as chain transfer agents. Typical chain transfer agents include non-copolymerizable chain transfer agents: saturated aliphatic aldehydes, such as formaldehyde and acetaldehyde; saturated aliphatic ketones, such as acetone, diethyl ketone and diamyl ketone; saturated aliphatic alcohols, such as methanol, ethanol and propanol; paraffins and cycloparaffins such as pentane, hexane and cyclohexane; aromatic compounds, such as toluene, diethylbenzene and xylene; and other compounds which act as chain terminating agents such as propylene, carbon tetrachloride and chloroform. Non-copolymerizable chain transfer agents such as, acetaldehyde function in this invention.

The tubular ethylene alkyl acrylate and alkyl methacrylate copolymers used to make invention adhesives are characterized by the following properties:

(a) Alkyl acrylate or alkyl methacrylate comonomer content of from 5–20 mol %. These mole percents represent the moles of alkyl acrylate or alkyl methacrylate comonomer-derived units in the copolymer as a percentage of the total number of moles of monomer-derived and comonomer-derived units in the copolymer. When more than one alkyl acrylate or alkyl methacrylate comonomer is used, the 5–20 mol % amount represents the total amount of all of the alkyl acrylate and alkyl methacrylate comonomer content. Alternative lower limits of the alkyl acrylate or alkyl methacrylate comonomer-derived unit content can be at least 6%, at least 7%, at least 8%, at least 9% or at least 10% (mole percents). It is a particular feature of the copolymers of the present invention that relatively large amounts of alkyl acrylate or alkyl methacrylate comonomer can be incorporated in the copolymer while still maintaining the described properties.

In embodiments including ethylene, alkyl acrylate or alkyl methacrylate, and a comonomer having a reactivity ratio relative to ethylene of 2 or less (such as a vinyl ester), the copolymers of the present invention preferably include at least 2 mol % or at least 3 mol % or at least 4 mol % of the alkyl acrylate or alkyl methacrylate comonomer, and at least 0.5 mol % or at least 1 mol % or at least 1.5 mol % of the comonomer having a reactivity ratio $r_2$ relative to ethylene of 2 or less, with the total comonomer content being as described above.

(b) Melt index in g/10 min of 1 to 10,000. Alternative lower limits of the melt index can be at least 100 g/10 min, at least 300 g/10 min, at least 600 g/10 min, at least 900 g/10 min, at least 1500 g/10 min, at least 2500 g/10 min, or at least 5000 g/10 min. Thus, melt index, in g/10 min, can fall within the following ranges: 100–10,000; 300–10,000; 600–10,000; 900–10,000; 1500–10,000; 2500–10,000; or 5,000–10,000 g/10 min.

(c) Heat resistance: Percent melted at 60° C. The copolymers of the present invention and adhesive formulations using them show increased heat resistance relative to comparable conventional materials. For many applications, heat resistance at 60° C. is required, since the product incorporating the adhesive might be exposed to temperatures of up to about 60° C. during shipping, storage or in use. Thus, differential scanning calorimetery (DSC) can be used to measure the amount of the copolymer melted at 60° C. as a measure of heat resistance. Using this measure, the copolymers the present invention show a percent melting at 60° C. of less than 40%, preferably less than 30%, and more preferably less than 25%.

In embodiments including ethylene, alkyl acrylate or alkyl methacrylate, and a comonomer having a reactivity ratio $r_2$ relative to ethylene of 2 or less (such as a vinyl ester), the copolymers of the present invention show a percent melted at 60° C. of less than 70% or less than 60% or less than 50%.

(d) Heat resistance: Temperature at % melted. An alternative measure of heat resistance is the temperature required to melt a predetermined percentage of the copolymer, and this temperature can also be measured by DSC. The copolymers of the present invention show increased heat resistance over conventional comparable copolymers, as shown in the Examples herein; i.e., a higher temperature is required to melt a given percentage of the copolymer. Using these measures, the temperature required to melt 50% of a sample of the copolymers of the present invention can be at least 80° C., preferably at least 85° C., and more preferably at least 90° C. The temperature required to melt 80% of a sample of the copolymers of the present invention can be at least 100° C., preferably at least 105° C. The temperature required to melt 100% of a sample of the copolymers of the present invention can be at least 110° C., preferably at least 115° C., more preferably at least 120° C.

In embodiments including ethylene, alkyl acrylate or alkyl methacrylate, and a comonomer having a reactivity ratio $r_2$ relative to ethylene of 2 or less, the temperature required to melt 50% of a sample of the copolymers of the present invention can be at least 40° C. or at least 50° C. or at least 60° C.; the temperature required to melt 80% of a sample of the copolymers of the present invention can be at least 70° C. or at least 80° C. or at least 85° C.; and the temperature required to melt 100% of a sample of the copolymers of the present invention can be at least 80° C. or at least 90° C. or at least 100° C.

(e) Vicat Softening Point: Another measure of the higher heat resistance of copolymers the present invention is shown by the Vicat Softening Point as determined by the modified ASTM procedure described in the Examples section herein using a 200 g load instead of a 1000 g load. Using this measure, copolymers of the present invention can have a Vicat Softening Point of at least 45° C., preferably at least 50° C., more preferably at least 55° C., and still more preferably at least 60° C.

In embodiments including ethylene, alkyl acrylate or alkyl methacrylate, and a comonomer having a reactivity ratio $r_2$ relative to ethylene of 2 or less, copolymers of the present invention can have a Vicat Softening Point of at least 30° C. or at least 35° C. or at least 40° C.

f) Peak Melting Point: Copolymers of the present invention show a higher peak melting point, determined by DSC,l relative to conventional copolymers having the same overall composition. Thus, copolymers of the present invention can have a peak melting point of at least 100° C., at least 105° C., or at least 110° C. The copolymers of the present invention can have a peak melting point at least 25° C., at least 35° C. or at least 50° C. greater than the peak melting temperature of a uniformly homogeneous copolymer of the same chemical composition, such as those produced in autoclave reactors.

In embodiments including ethylene, alkyl acrylate or alkyl methacrylate, and a comonomer having a reactivity ratio $r_2$ relative to ethylene of 2 or less, copolymers of the present invention can have a peak melting point of at least 80° C. or at least 90° C. or at least 95° C.

Figure 6:
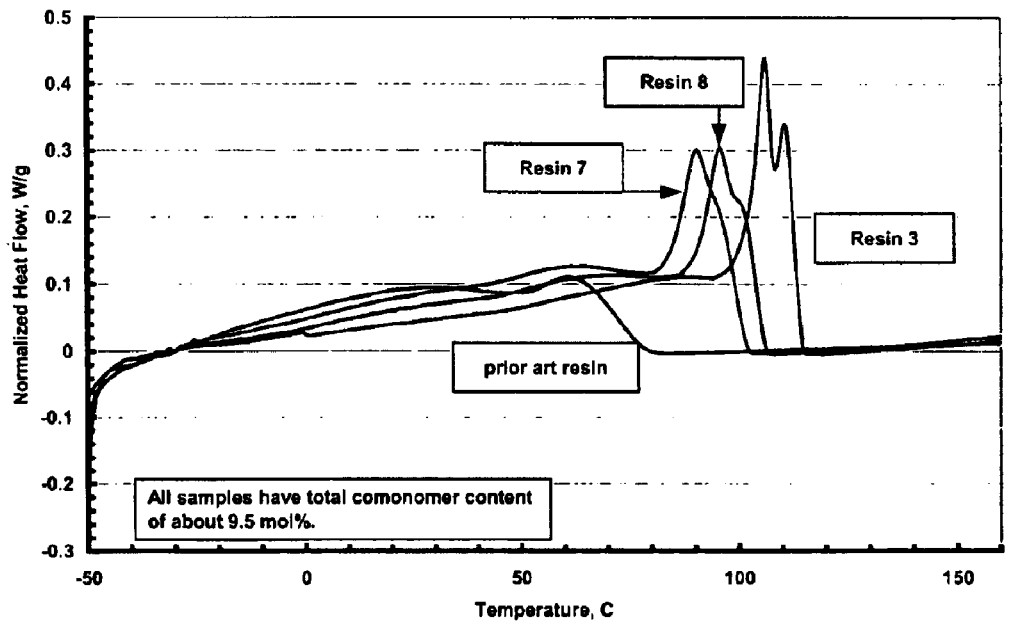
FIG. 6 shows the differential scanning calorimetry (DSC) thermograms for a copolymer used in the invention (Resin 3), other copolymers used in the invention (Resins 7 and 8) and a conventional autoclave copolymer (Comparative Example A).

As used herein and in the appended claims, the term "peak melting point", "Tm" and "maximum peak melting temperature" refer to the temperature of the peak having the highest melting temperature, such as, for example, the 111.5° C. peak of Resin 2. It should be noted in this connection that the maximum peak melting temperature can be located on a peak that appears on the DSC trace to be a higher temperature shoulder on a larger peak, such as, for example, the maximum peak melting temperature of 99.86° C. for Resin 8, shown in FIG. 6.

(g) Other values: although specific values are given for the physical properties described above, it should be emphasized that copolymers of the present invention can have other values, such as, in particular, the values exemplified in the Examples herein.

(h) Combinations of properties: It should be understood that copolymers of the present invention, and adhesive compositions including these copolymers, can have different combinations of the above properties, depending upon the desired end use of the copolymer or adhesive. Such copolymers with combinations of properties, as exemplified by the Examples herein, are surprising and unexpected; i.e., it was not heretofore known or expected that polymers having these combinations of properties could be produced.

Tackifiers

Some embodiments of the invention include a tackifier. As used herein, the terms "tackifier" and "tackifying resin" are used synonymously to include hydrocarbon resins, synthetic polyterpenes, rosin esters and natural terpenes which are semi-solid at ambient temperatures, and soften or liquefy at temperatures ranging generally from about 50° C. to about 140° C., preferably from about 85° C. to about 120° C. Exemplary of the tackifying resins are compatible resins such as:

(1) natural and modified rosins, such as gum rosin, wood rosin, tall oil rosin, distilled rosin, hydrogenated rosin, dimerized rosin, and polymerized rosin;

(2) glycerol and pentaerythritol esters of natural and modified rosins, such as the glycerol ester of pale, wood rosin, the glycerol ester of hydrogenated rosin, the glycerol ester of polymerized rosin, the pentaerthritol ester of hydrogenated rosin, and the phenolic modified pentaerythritol ester of rosin;

(3) copolymers of natured terpenes, such as styrene/terpene and alpha methyl styrene/terpene;

(4) polyterpene resins having a softening point, as determined by ASTM method E28–58T, of from about 50–150° C., such resins generally resulting from the polymerization of terpene hydrocarbons, such as the bicyclic monoterpene known as pinene, in the presence of Friedel-Crafts catalysts at moderately low temperatures; the hydrogenated polyterpene resins are also included;

(5) phenolic modified terpene resins and their hydrogenated derivatives, such as the resin product resulting from the acid medium condensation, of a bicyclic terpene and a phenol;

(6) aliphatic petroleum resins having a Ball and Ring Softening Point of from 50–135° C., resulting from polymerization primarily olefins and diolefins; also included are the hydrogenated aliphatic petroleum hydrocarbon resins;

(7) aromatic petroleum hydrocarbon resins and mixed aromatic and aliphatic paraffin hydrocarbon resins, and the hydrogenated derivatives thereof;

(8) aromatic modified alicyclic petroleum hydrocarbon resins and the hydrogenated derivatives thereof; and (9) alicyclic petroleum hydrocarbon resins and the hydrogenated derivatives thereof.

Also suitable tackifying resins are those species named above that are liquid at room temperature.

In one embodiment, the tackifier is present in an amount of from 5 to 60% by weight, based on the total weight of the composition. Alternatively, the tackifier can be present in an amount of at least 10 percent, or at least 15% by weight, or less than 40%, less than 30%, or less than 20% by weight. Ranges from any of the lower limits to any of the upper limits are also within the scope of the invention. That is, tackifier can be present at 5–20%; 5–30%; 5–40%; 5–60%; 10–20%; 10–30%; 10–40%; 10–60%; 15–20%; 15–30%; 15–40% by w In other embodiments, the tackifier is present at less than 15% by weight. In this embodiment, the tackifier can be present in amounts of 1% or 5% to 10% or 15%, with ranges from any of the lower limits to any of the upper limits also being within the scope of the invention: 1–10; 1–15; 5–10; or 5–15% by weight.

In another embodiment, the present invention provides adhesive compositions without the need for tackifiers.

Waxes

Some embodiments of the invention include waxes. When used, the optional waxes can be included to further reduce viscosity and to alter adhesive open and set times. Suitable waxes include paraffin waxes, microcrystalline waxes, high density low molecular weight polyethylene waxes, by-product polyethylene waxes, Fischer-Tropsch waxes, oxidized Fischer-Tropsch waxes, and hydroxy stearamide waxes. The term "synthetic high melting point wax" is commonly used to refer to high density low molecular weight polyethylene waxes, by-product polyethylene waxes, and Fischer-Tropsch waxes, and these synthetic high melting point waxes are suitable.

Advantageously, the present invention provides adhesive compositions that can have the desired viscosity and other properties without the need for expensive, high melting point waxes. The amount of wax used will depend upon the properties desired, and the particular wax chosen, but is generally 0–20% or 5–20; 0–15; or 5–15% by weight, based on the total weight of the composition.

Other Additives

Hot melt adhesive compositions of the invention can also use a variety of other additives commonly used in the art, such as plasticizers, stabilizers, antioxidants, pigments, and the like.

Liquid plasticizers such as oils, and solid plasticizers such as benzoate esters available from Velsicol Chemical Corp. in Rosemont, Ill. under the trade name Benzoflex, can be used to obtain longer open times, lower viscosity, improved adhesion and improved cold temperature flexibility. Plasticizing oils that have been found useful include olefin oligomers and low molecular weight polymers, as well as vegetable and animal oils and their derivatives. Suitable petroleum-derived oils are relatively high boiling point materials containing only a minor proportion of aromatic hydrocarbons, preferably less than 30%, and more preferably less than 15% by weight of the oil. Alternatively, the oil may be essentially free of aromatics.

A stabilizer or antioxidant is also preferably used in hot melt adhesives. The terms "stabilizer" and "antioxidant" as used herein interchangeably to mean compounds which are added to protect the adhesive from degradation caused by reaction with oxygen, which is induced by such things as heat or light. Such antioxidants are commercially available from Ciba Geigy located in Hawthorne, N.Y., and include Irganox 565, Irganox 1010, and Irganox 1076, which are hindered phenolic antioxidants. These primary antioxidants act as free radical scavengers and may be used alone or in combination with other antioxidants such as phosphite antioxidants. Phosphite antioxidants are considered secondary antioxidants, and are not generally used alone; these secondary antioxidants are primarily used as peroxide decomposers. Many other antioxidants are available for use by themselves, or in combination with other antioxidants, and are well-known in the art. These antioxidants are typically used in amounts of 0 to 2% by weight.

Preparation and Use of Hot Melt Adhesive Compositions

The hot melt adhesive compositions described herein can be prepared using conventional methods well known in the art. For example, the polymer, tackifier, and desired optional ingredients such as plasticizer oil, wax, liquid resin tackifiers, etc., can be blended under low or high shear mixing at elevated temperatures to form a fluid melt. Mixing temperatures depend upon the particular adhesive formulation, and are generally in the range of 130° C.–200°

C., with about 150° C. to about 160° C. being a typical suitable range. Other embodiments use mixing temperatures selected from the following ranges; 130–160; 130–200; 150–160; and 150–200° C.

In one embodiment, the tubular reactor ethylene alkyl acrylate or alkyl methacrylate copolymers themselves are suitable for use as hot melt adhesives, without the need to incorporate additional components. It should be understood that for these "neat" copolymer adhesives, the term "adhesive composition" is still used, although the composition may contain only a single component, and optionally conventional additives.

Hot melt adhesives of the invention are particularly well-suited to various applications, such as, but not limited to:

packaging applications, such as forming cases, cartons, trays and the like, and/or sealing such cases, cartons or trays;
bookbinding;
disposables;
product assembly; and
nonwoven applications, where the adhesive is applied as a spray.

Thus, in another embodiment, the present invention is directed to an article having a first surface and a second surface at least a portion of which is adhered to the first surface by any of the hot melt adhesives described herein. The article can be, for example, a case, a carton or a tray, wherein the hot melt adhesive is used to adhere one or more surfaces to form the case, carton or tray, or to close the case carton or tray; a book, wherein the hot melt adhesive is used as a bookbinding adhesive; or a product in which the hot melt adhesive is used as a product assembly adhesive. Such products can include, for example, disposables.

In another embodiment, the hot melt adhesives of the present invention can be used in glue stick formulations where the improved heat resistance of such hot melt adhesives is advantageous. Thus, in this embodiment, the present invention provides a glue stick, the glue stick including a hot melt adhesive composition as described above.

Various additives can be used in the hot melt adhesive compositions described herein, the specific additives and their amounts being chosen to impart desired properties according to the particular intended use. Such formulations will be readily apparent to those skilled in the art.

The hot melt adhesives described herein may be applied using conventional technology, such as piston or gear pump extrusion equipment, or wheel applicators. Examples of such equipment are those manufactured by Nordson, ITW Dynatec, and Slauterback. The hot melt adhesives can also be applied using air assisted extrusion applicators such as spiral, random or melt blown spray patterns. Such equipment is available from Nordson, J and M, and ITW Dynatec. The particular method of application will depend upon various factors well understood in the art, such as the article to which the adhesive is applied, and the conditions under which the adhesive or article needs to function. Application of hot melt adhesives by any such conventional techniques is well within the understanding of one skilled in the art.

In addition to the uses described above, the adhesive compositions of the present invention are suitable for other process applications. For example, in one embodiment, the present invention provides adhesive compositions that have a low application temperature. Thus, the present invention provides adhesive compositions that can have a melt viscosity of less than 3300 cps at 140° C. while still possessing good adhesion properties and good heat resistance as shown, for example, by Example 3 below.

In another embodiment, the present invention provides sprayable adhesive compositions.

In another embodiment, the present invention provides adhesive compositions that do not require a tackifier (e.g., the copolymer itself, or formulated with other, non-tackifier additives), or use only a relatively small amount of tackifier, such as adhesive compositions with less than 20% tackifier by weight.

EXAMPLES

Materials and Methods

In the following examples, which are provided for illustrative purposes only, all parts are by weight and all temperatures in degrees Celsius, unless otherwise noted. The example hot melt adhesive compositions were prepared by blending all of the components under low or high shear mixing at elevated temperatures to form a fluid melt. Mixing temperatures can vary from about 130° C. to about 200° C., generally from about 150° C. to about 160° C.

In characterizing and evaluating the performance characteristics of the polymers and adhesive compositions described below, the following test procedures were used.

(a) Adhesive Melt Viscosity (ASTM D-3236): Melt viscosity profiles were measured at temperatures from 120° C. to 190° C. using a Brookfield Thermosel viscometer and a number 27 spindle.

(b) Peel Strength (modified ASTM D1876): Substrates (1×3 inches (25×76 mm)) are heat sealed with adhesive film (5 mils (130 μm) thickness) at 135° C. for 1 to 2 seconds and 40 psi (0.28 MPa) pressure. Bond specimens were peeled back in a tensile tester at a constant crosshead speed of 2 in/min (51 mm/min). The average force required to peel the bond (5 specimens) apart was recorded.

(c) Shear Adhesion Fail Temperature (SAFT) (modified ASTM D4498) measures the ability of the bond to withstand an elevated temperature rising at 10° F. (5.5° C.)/15 min, under a constant force that pulls the bond in the shear mode. Bonds 1 inch by 1 inch (Kraft paper) (25 mm×25 mm) were formed of adhesive by heat sealing as in procedure "(b)" above for 1.5 s. The test specimens were suspended vertically in an oven at 32° C. with a 500 g load attached to the bottom. The temperature at which the weight fell was recorded. Adhesives possessing high failure temperature are essential for the assembly of packaging goods that are often subjected to very high temperatures during storage and shipping.

(d) Tensile Strength and Elongation (ASTM D412 and ASTM D638): 75 mil (1.9 mm) pads were made and measured according to ASTM procedures D412 and D638.

(e) Glass transition temperature was measured according to ASTM 1356-95.

(f) Low Temperature Fiber Tear: Kraft paper bonds were prepared as in procedure "(b)" above. The bond specimens were place in a freezer or refrigerator to obtain the desired test temperature. The bonds were separated by hand and a determination made as to the type of failure observed. The amount of fiber tear is expressed in percentage. "SF" indicates substrate failure.

(g) Melt Index: determined according to ASTM D-1238, with the following exceptions and clarifications. For samples with MIs of less than about 100 g/10 min, condition 190/2.16 of the ASTM method is used. For samples with MIs greater than about 100 g/10 min, the reported MI is based on a mathematical equation used to correlate data from condition 125/0.325 to condition 190/2.16. For those samples, the time needed for the piston to travel 25.4 mm at a melt temperature of 125° C. and 0.325 kg load is determined and used in the equation below to calculate the logarithm of a melt flow rate at 190° C. and 2.16 kg; the antilog of this value is reported as the Melt Index:

Log $MI$=1.8311+0.8237 log(928.4/$t$), where t is the piston travel time in seconds. Melt index is reported in units of g/10 min, or the numerically equivalent units of dg/min.

(h) Density (g/cm$^3$) was determined using chips cut from plaques compression molded in accordance with ASTM D-1292 Procedure C, aged in accordance with ASTM D-618 Procedure A, and measured according to ASTM D-1505.

(i) Comonomer contents were determined using either an FTIR procedure using calibration standards with assigned values measured by proton NMR, or by using proton NMR directly.

(j) The concentration of n-butyl acrylate in ethylene n-butyl acrylate copolymers was determined from a proton NMR spectrum with the temperature probe set for 120° C. Prior to data collection, approximately 30 mg of the sample were dissolved in about 3 mL of tetrachloroethane-d$^2$ at 130° C. Moles of n-butyl acrylate were calculated by dividing the integrated area of the region between 3.5 and 4.5 ppm by a factor of two. Moles of ethylene were calculated by subtracting ten times the number of moles of n-butyl acrylate from the integrated area of the region between 0.5 and 3.0 ppm and diving this result by four.

(j) The concentration of n-butyl acrylate in ethylene n-butyl acrylate copolymers was determined from a prozon NMR spectrum with the temperature probe set for 120° C. Prior to data collection, approximately 30 mg of the sample were dissolved in about 3 mL of tetrachloroethane-d$^2$ at 130° C. Moles of n-butyl acrylate were calculated by dividing the integrated area of the region between 3.5 and 4.5 ppm by a factor of two. Moles of ethylene were calculated by subtracting ten times the number of moles of n-butyl acrylate from the integrated area of the region between 0.5 and 3.0 ppm and dividing this result by four.

Similar calculations well-known in the art were used for determining vinyl acetate concentrations.

(l) Differential Scanning Calorimetry (DSC) thermograms used to measure several parameters, such as Peak Melting Temperatures, Peak Crystallization Temperatures, Percent Melted at 60° C., and Temperature at which 50%, 80% and 100% of the sample was melted, were determined by two methods. "Method 1" used test method ASTM D-3417, with the exception that 5 minute hold times were used at the maximum and minimum temperatures used in the test, instead of 10 minutes. "Method 2" used the 10 minute hold time prescribed by ASTM D-3417.

(m) Vicat Softening Point was determined on specimens compression molded in accordance with ASTM D-1928 Procedure C, aged in accordance with ASTM D-618 Procedure A, and measured in accordance with ASTM D-1525, Rate B, with the exception that a non-standard 200 g load was used instead of the standard 1000 g load.

The adhesive examples are made using several ethylene n-butyl acrylate (EnBA) co-polymers produced in a tubular reactor by ExxonMobil Chemical Company located in Houston, Tex.

Ethylene n-butyl acrylate copolymers of the present invention were produced in a high pressure tubular reactor similar in design to the tubular reactor disclosed in U.S. Pat. No. 4,135,044, but without side-streams feeding the reactor. The monomers were of conventional, commercial purity and there were no efforts to increase purity or modify them in any way. The n-butyl acrylate monomer was not stripped of oxygen or storage stabilizer.

The polymerization was initiated using the following mixture of initiators at the indicated amounts by weight: t-amylperoxyneodecanoate, 39.5%, t-amyl peroxypivalate, 23.7%, and t-amyl peroxy-2-ethylhexanoate, 36.8%. These were dissolved in a hydrocarbon solvent at 34.3 wt % initiator mixture to 65.7 wt % solvent.

Reactor throughput was held constant at 18.5 metric tons/hour. Reactor conditions and production results are shown in Table 1 below. Throughout the campaign, no significant reactor or pre-heater fouling was apparent. In Table 1, "LPS" and "HPS" indicate the low pressure separator and the high pressure separator, respectively. The tubular reactor was configured for either 3-point initiator injection or 4-point initiator injection. The dashed lines "--" in Table 1 indicate runs in which only 3-point initiation injection was used. The total initiator feed to the downstream injection points is given in Table 1 below. Initiator feed to each of the individual downstream injection points was apportioned between all of them to get the indicated peak temperatures.

Acetaldehyde was used as the chain transfer agent for all these samples. The acetaldehyde feed rate that had been calculated from plant experience with autoclave polymerized ethylene n-butyl acrylate was found to be well below the amount actually needed to get the desired melt index. More than double the calculated flow rate was actually needed.

The concentration of n-butyl acrylate in the Example copolymers was checked during the run for the purpose of process control by the plant Quality Control Laboratory using an FTIR method they had developed and use routinely for autoclave polymerized ethylene n-butyl acrylate copolymer made at the same plant. This method requires appropriate calibration standards to yield correct values. The comonomer contents of the Example copolymers were also subsequently determined by proton NMR as described above, and lower values were obtained. Proton NMR is an absolute analytical method that does not require any calibration standards to determine correct values. The difference in values determined by the two methods indicates that the more crystalline tubular reactor copolymers of the present invention have infrared absorbance characteristics which are different than those characteristics of conventional autoclave-produced ethylene n-butyl acrylate copolymers.

TABLE 1

Reactor Conditions

| | Resin | | | | |
|---|---|---|---|---|---|
| | 1 | 2 | 3 | 4 | 5 |
| Production Rate (kg/hr) | 5925 | 5925 | 5920 | 7720 | 7761 |
| Acetaldehyde Rate (kg/hr) | 61.4 | 61.4 | 59.1 | 82.7 | 52.7 |
| nBA Rate (kg/hr) | 1395 | 1664 | 1921 | 2232 | 2260 |
| Reactor Pressure (MPa) | 262 | 262 | 262 | 276 | 276 |
| 1st Inlet Temperature (° C.) | 143 | 143 | 143 | 143 | 143 |
| 2nd Inlet Temperature (° C.) | 157 | 157 | 157 | 160 | 157 |
| 3rd Inlet Temperature (° C.) | 168 | 168 | 169 | 157 | 157 |
| 4th Inlet Temperature (° C.) | 120 | 119 | 122 | 157 | 154 |
| 1st Peak Temperature (° C.) | 216 | 216 | 216 | 221 | 221 |
| 2nd Peak Temperature (° C.) | 224 | 224 | 224 | 216 | 216 |
| 3rd Peak Temperature (° C.) | 232 | 232 | 232 | 213 | 213 |
| 4th Peak Temperature (° C.) | — | — | — | 207 | 207 |
| Initiator Feed Rate: 1st Injection Point (kg/hr) | 6.5 | 6.5 | 6.5 | 7.9 | 8.4 |
| Initiator Feed Rate: Sum of All Downstream Injection Points (kg/hr) | 19.4 | 19.4 | 19.4 | 23.4 | 25.2 |
| LPS Polymer Temp (° C.) | 117 | 118 | 121 | 113 | 127 |
| LPS Pressure (kPa) | 73.1 | 74.5 | 78.6 | 137.9 | 144.8 |
| HPS Temperature(° C.) | 161 | 160 | 161 | 176 | 176 |
| HPS Pressure (MPa) | 30.4 | 30.4 | 30.4 | 30.5 | 30.4 |
| Pack-out MI (dg/min) | — | — | — | — | 364 |
| Pack-out Viscosity (MPa · s) | 2575 | 2912 | 4475 | 11070 | — |
| nBA (wt %) by FTIR* | 27.36 | 31.18 | 35.11 | 35.75 | 36.47 |

*see Table 2 for correct values determined by proton NMR.

These Resins contain relatively high levels of n-butyl acrylate comonomer, from about 7 mol % to over 10 mol %. Melt index ranged from a low of about 364 g/10 min to over an estimated 2500; melt viscosity at 190° C. was used in place of melt index for the grades with greater than 330 MI. Melt viscosity ranged from as high as about 48,000 mpa·s to as low as about 2400 mPa·s.

The composition, melt viscosity (or melt index $I_{2.16}$) and density of the copolymers, labeled as Resins 1–5, are shown in Table 2.

TABLE 2

Physical Properties of Tubular EnBA Copolymers

| | Resin No. | | | | |
|---|---|---|---|---|---|
| | 1 | 2 | 3 | 4 | 5 |
| Melt Viscosity (mPa · s at 190° C.) | 2435 | 2870 | 4275 | 11,470 | 48,000 |
| MI (g/10 min) | n/a* | n/a* | n/a* | n/a* | 364 |
| Density (g/cm$^3$) | 0.938 | 0.938 | 0.938 | 0.941 | 0.941 |
| nBA (mol %)[a] | 6.90 | 8.10 | 9.32 | 9.33 | 9.42 |
| nBA (wt %)[b] | 25.30 | 28.71 | 31.97 | 31.98 | 32.22 |

*not applicable
[a] by NMR
[b] calculated from mol % by NMR

TABLE 3

DSC Properties of Tubular EnBA Copolymers (Method 1)

| | Resin No. | | | | |
|---|---|---|---|---|---|
| | 1 | 2 | 3 | 4 | 5 |
| DSC Peak Tm (° C.)[a] | 108.0 | 107.7 | 105.9 | 109.3 | 108.8 |
| | 112.0 | 111.4 | 110.5 | 113.3 | 113.3 |
| DSC Peak Tc (° C.) | 96.1 | 95.1 | 92.0 | 94.4 | 91.7 |
| Heat of Melting (J/g) | 86.8 | 72.8 | 60.5 | 72.7 | 75.2 |
| Heat of Fusion (J/g) | −65.3 | −60.5 | −85.4 | −60.7 | −78.5 |

Properties of the copolymers were measured by Differential Scanning Calorimetry (DSC) using two methods ("Method 1" and "Method 2") described above. The properties using the two methods are shown in Tables 3 and 4, respectively.

TABLE 3-continued

DSC Properties of Tubular EnBA Copolymers (Method 1)

| | Resin No. | | | | |
|---|---|---|---|---|---|
| | 1 | 2 | 3 | 4 | 5 |
| % Melted at 60° C. | 22.8 | 26.4 | 17.5 | 20.2 | 23.3 |
| T at 50% Melted (° C.) | 88.5 | 86.5 | 91.5 | 92.0 | 92.5 |
| T at 80% Melted (° C.) | 107.5 | 106.5 | 106.3 | 109.5 | 110.0 |
| T at 100% Melted (° C.) | 123 | 120 | 116 | 119 | 124 |
| Vicat SP (° C.) | 69.1 | 60.9 | 54.4 | 63.6 | 63.5 |

(a) two peaks observed

TABLE 4

DSC Properties of Tubular EnBA Copolymers (Method 2)

| | Resin No. | | | | |
|---|---|---|---|---|---|
| | 1 | 2 | 3 | 4 | 5 |
| DSC Melting Peak(s) (° C.)[a] | 112.3 | 111.5 | 110.6 | 113.6 | 113.2 |
| | 108.2 | 107.4 | 106.0 | 109.4 | 109.3 |
| | 88.88 | 88.88 | 88.88 | 90.69 | 91.86 |
| DSC Crystallization Peak(s) (° C.) | 97.00 | 96.32 | 93.11 | 95.33 | 93.45 |
| Heat of Melting (J/g) | 85.9 | 73.3 | 65.7 | 65.2 | 64.4 |
| Heat of Fusion (J/g) | −103 | −93.1 | −82.6 | −84.4 | −85.2 |
| % Melted at 60° C. | 24.6 | 25.3 | 27.8 | 20.8 | 20.6 |
| T at 50% Melted (° C.) | 88.3 | 87.6 | 85.5 | 94.7 | 96.6 |
| T at 80% Melted (° C.) | 107.8 | 107.0 | 106.1 | 110.2 | 110.4 |
| T at 100% Melted (° C.) | 116.5 | 115.9 | 115.6 | 117.9 | 118.4 |

(a) 3 peaks observed

Figure 5:
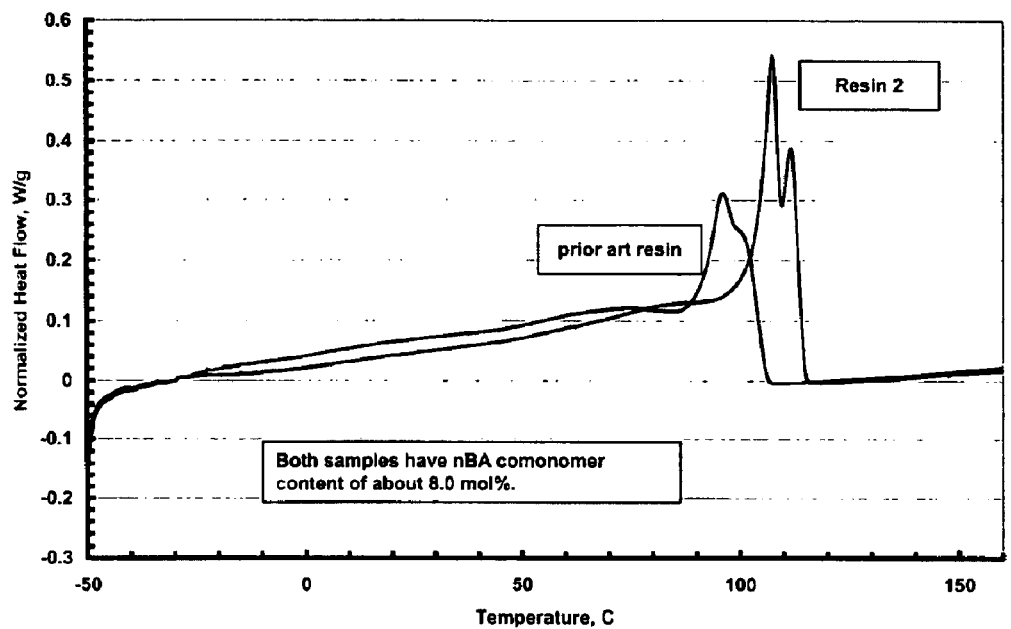
FIG. 5 shows the differential scanning calorimetry (DSC) thermograms for the copolymer of Resin 2 compared to the peak melting temperature of a single-point tubular copolymer of approximately the same comonomer content (Comparative Example H).

In Table 4, three peaks are reported for the DSC melting peak values. These "peaks" were assigned based on DSC curves as shown in FIG. 5. For example, referring to FIG. 5 and Table 4, the DSC trace for Example 2 shows a small peak at 89° C., and overlapping peaks at about 107° C. and 111° C. These are the three peaks reported in Table 4.

Examples 1–13

The Resins 1–5 were used to prepare a series of hot melt adhesives in accordance with the present invention.

Adhesive formulations using the EnBA copolymers of Table 1 were prepared. Table 5 shows the composition of adhesive formulations labeled as Examples 1–13. ESCOREZ 2596 is an aromatic-modified aliphatic resin available from ExxonMobil Chemical Company. ESCOREZ 5600 is a hydrogenated aromatic-modified cycloaliphatic tackifier also available from ExxonMobil Chemical Company. SYLVALITE RE 100 is a tall oil rosin ester available from Arizona Chemical located in Panama City, Fla. PARAFLINT H1 is a Fischer-Tropsch wax available from Sasol-SA/Moore & Munger. IRGANOX 1010 is a hindered phenolic antioxidant available from Ciba-Geigy Corporation located in Hawthorne, N.Y. KAYDOL is a white mineral oil available from Witco Corporation located in Greenwich, Conn.

TABLE 5

Adhesive Compositions 1–13

| | 1 | 2 | 3 | 4 | 5 | 6 | 7 | 8 | 9 | 10 | 11 | 12 | 13 |
|---|---|---|---|---|---|---|---|---|---|---|---|---|---|
| RESIN 1 | — | — | — | 60 | — | — | — | — | — | — | — | — | — |
| RESIN 2 | — | — | — | — | — | 60 | 60 | 60 | 50 | 70 | 80 | 100 | — |
| RESIN 3 | — | — | — | — | 60 | — | — | — | — | — | — | — | 100 |
| RESIN 4 | 40 | — | 35 | — | — | — | — | — | — | — | — | — | — |
| RESIN 5 | — | 35 | — | — | — | — | — | — | — | — | — | — | — |
| ESCOREZ 2596 | — | — | — | — | — | 40 | — | — | — | — | — | — | — |
| ESCOREZ 5600 | 60 | 50 | 50 | 40 | 40 | — | 40 | — | 45 | 30 | 20 | — | — |
| SYLVALITE RE 100 | — | — | — | — | — | — | — | 40 | — | — | — | — | — |
| PARAFLINT H1 | — | 15 | 15 | — | — | — | — | — | 5 | — | — | — | — |
| IRGANOX 1010 | 0.25 | 0.25 | 0.25 | 0.25 | 0.25 | 0.25 | 0.25 | 0.25 | 0.25 | 0.25 | 0.25 | — | — |

Comparative Examples A–G

Comparative hot melt adhesive examples were made with the following adhesive polymers. ENABLE EN 33330 (33 wt. % nBA; 330 MI) and EN 33900 (33 wt. % nBA; 8,300 cps @ 190° C.) are EnBA copolymers produced in an autoclave reactor by ExxonMobil Chemical Company. The MI value for ENABLE EN 33900 is estimated to about 900. ESCORENE 7710 (28 wt % VA; 420 MI), ESCORENE MV 02528 (28 wt % VA; 3,100 cps @ 190° C.) and MV 02520 (20 wt. % VA; 3,200 cps @ 900° C.) are ethylene vinylacetate copolymers available from ExxonMOBIL Chemical Company. MI values of EVA copolymers like ESCORENE MV 02520 and MV 02528 are generally not measured but have been estimated to be approximately 2500 based on their melt viscosity at 190° C. EPOLENE C10 is a low molecular weight polyethylene homopolymer (2250 MI) available from Eastman Chemical Co. located in Kingsport, Tenn. Formulation used to make comparative Examples A through G are shown in Table 7.

TABLE 6

Comparative Examples A–G

| Composition | A | B | C | D | E | F | G |
|---|---|---|---|---|---|---|---|
| ESCORENE UL 7710 | 35 | — | — | — | — | — | — |
| ESCORENE MV 02528 | — | — | — | 60 | — | — | — |
| ESCORENE MV 02520 | — | — | — | — | 60 | — | — |
| ENABLE EN 33330 | — | 35 | — | — | — | — | — |
| ENABLE EN 33900 | — | — | 35 | — | — | — | 40 |
| EPOLENE C10 | — | — | — | — | — | 60 | — |
| ESCOREZ 2596 | — | — | — | — | — | 40 | — |
| ESCOREZ 5600 | 50 | 50 | 50 | 40 | 40 | — | 60 |
| PARAFLINT H1 | 15 | 15 | 15 | — | — | — | — |
| IRGANOX 1010 | 0.25 | 0.25 | 0.25 | 0.25 | 0.25 | 0.25 | 0.25 |

Figure 3:
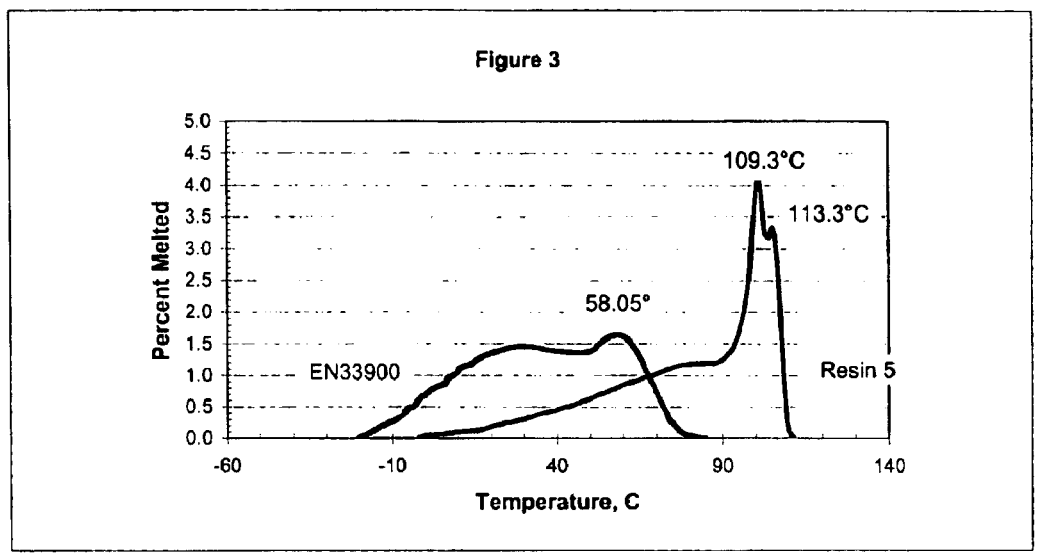
Figure 4:
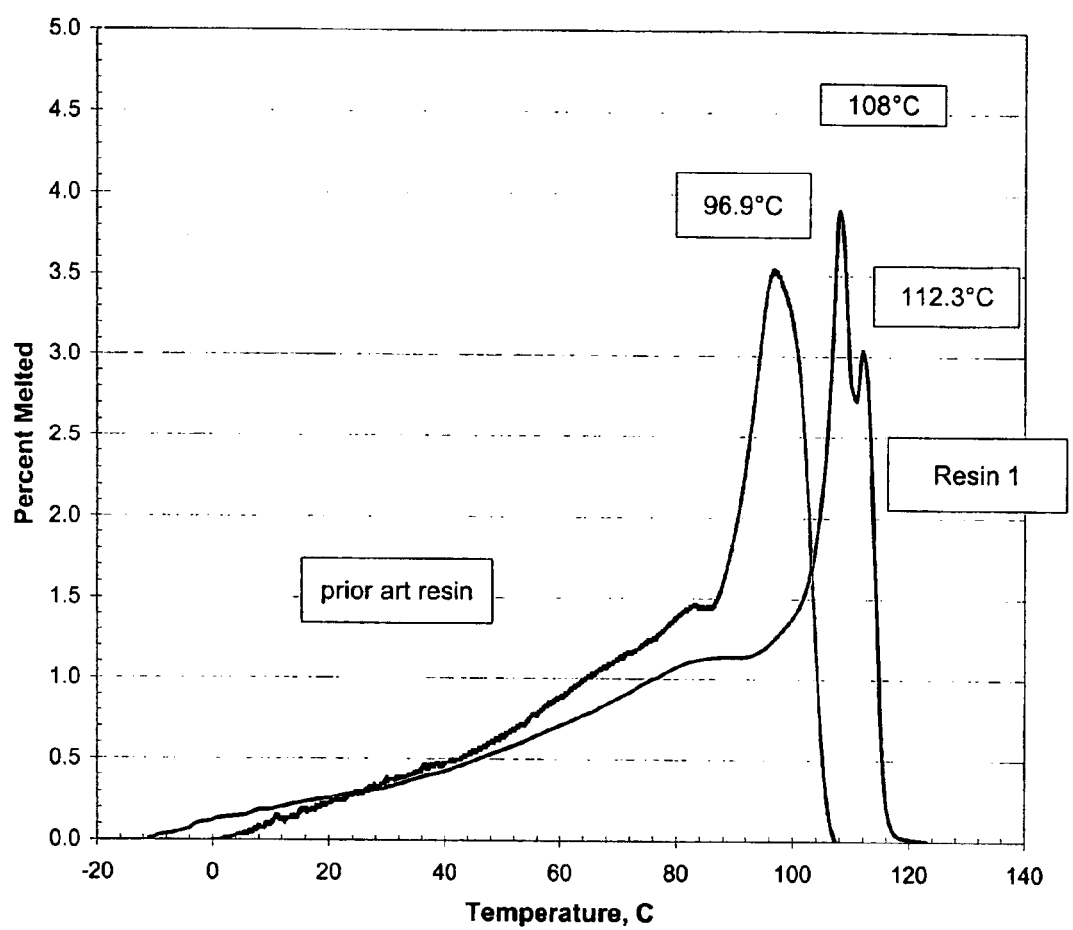
FIG. 4 shows the differential scanning calorimetry (DSC) thermograms for a copolymer used in the present invention (Resin 1) and a comparative non-inventive copolymer (Comparative Example G).

Properties of Examples 1–13 and A–G were measured by the methods described above. FIG. 3 shows a differential scanning calorimetry (DSC) profile of the tubular roaster-produced ethylene n-butyl acrylate copolymer RESIN 5 (as in Table 1) and the conventional autoclave reactor-produced ethylene n-butyl acrylate copolymer EN 33900. As the Figure shows, the novel copolymer of the present invention shows a peak melting temperature more than 50 degrees higher than the conventional copolymer, even though the two polymers have approximately the same n-butyl acrylate comonomer content (32 wt % and 33 wt %, respectively) and similar viscosities (about 11,000 and 8,000 cps at 190° C., respectively).

The adhesive properties of various examples and comparative examples are shown in Tables 7 and 8.

TABLE 7

Adhesive Properties

| Adhesive Properties | A | B | C | 2 | 3 |
|---|---|---|---|---|---|
| Melt Viscosity (MPa · s) | | | | | |
| 180° C. | 863 | 1030 | 503 | 695 | 385 |
| 160° C. | 1472 | 1760 | 845 | 1255 | 648 |
| 140° C. | 2755 | 3285 | 1545 | 2510 | 1232 |
| 120° C. | 5850 | 6900 | 3170 | 5612 | 2900 |
| SAFT (° C.) | 81.5 | 76.7 | 70.8 | 95.4 | 94.3 |
| Cloud Point (° C.) | 101 | 101 | 100 | 101 | 99 |
| Peel to Aluminum (pli)* | 0.3 | 3.8 | 3.8 | 0.4 | 0.3 |
| (N · m) | 50 | 660 | 660 | 70 | 50 |
| Peel to Polyethylene (pli)* | 0.7 | 5.7 | 4.8 | 1.1 | 0.7 |
| (N · m) | 120 | 1000 | 840 | 190 | 120 |
| Peel to Kraft paper (% Fiber Tear at T) | | | | | |
| 24° C. | SF | SF | SF | SF | SF |
| −11° C. | 20 | SF | SF | SF | 50 |

*pounds per linear inch (lb/in)

TABLE 8

Adhesive Properties

| Adhesive Properties | A | 4 | 5 | 6 | 7 | 8 | 9 | D | E | F |
|---|---|---|---|---|---|---|---|---|---|---|
| Melt Viscosity (MPa · s) | | | | | | | | | | |
| 180° C. | 863 | 1087 | 1410 | 995 | 1150 | 1165 | 688 | 1475 | 1480 | 1170 |
| 160° C. | 1472 | 1810 | 2440 | 1680 | 1930 | 2025 | 1150 | 2550 | 2480 | 1965 |
| 140° C. | 2755 | 3262 | 4800 | 3162 | 3570 | 4025 | 2075 | 4900 | 4525 | 3600 |
| 120° C. | 5850 | 6575 | 10950 | 7000 | 7637 | 9087 | 4275 | 10750 | 9200 | 7350 |
| SAFT (° C.) | 81.5 | 98.3 | 83.6 | 91.4 | 96.2 | 88 | 95.8 | 56.5 | 70 | 87.5 |
| Cloud Point (° C.) | 101 | 101 | 98 | 103 | 100 | 200+ | 98 | <65 | <65 | 92 |
| Peel to Al (pli)* | 0.3 | 1.7 | 1.4 | 1.9 | 2.3 | 9.5 | 0.6 | 5.2 | 3.2 | 0.8 |
| (N · m) | 50 | 300 | 240 | 330 | 400 | 1700 | 100 | 910 | 560 | |
| Peel to PE (pli)* | 0.7 | 4.1 | 2.6 | 0.3 | 3.4 | 8.3 | 3.2 | 4.5 | 5.2 | 0.3 |
| (N · m) | 120 | 720 | 460 | 50 | 590 | 1500 | 560 | 790 | 910 | 50 |
| Peel to Kraft paper (% Fiber Tear @T) | | | | | | | | | | |
| 24° C. | SF | SF | SF | SF | SF | SF | SF | SF | SF | SF |
| −11° C. | 20 | SF | SF | SF | SF | SF | SF | SF | SF | 0 |

*pounds per linear inch (lb/in)

Comparative Example A represents a conventional EVA-based hot melt adhesive used for case and carton sealing and for tray forming. The comparative Example B and C hot melt adhesives are based on EnBA copolymers produced in an autoclave. Clearly, Examples 2 and 3, which contain EnBA copolymers of the invention produced in a tubular reactor, have superior elevated temperature performance (SAFT) than comparative Examples A–C while maintaining the good low temperature properties of the autoclave-produced EnBA counterparts. The adhesion performance of Examples 2 and 3 is comparable to comparative Example A.

Examples 1 and 10–13 also provide comparable elevated temperature performance as compared to Examples 4–9, as well as good low temperature adhesion to Kraft paper.

Examples 4–9 are based on the low viscosity, high MI EnBA copolymers made in a tubular reactor. These tubular EnBA copolymers differ primarily in n-butyl acrylate comonomer content. Examples 7, 8, and 9 are blended with different types of tackifiers, namely aliphatic, hydrogenated aromatic-modified cycloaliphatic, and tall oil rosin ester, respectively. Comparative Examples D and E are based on high MI EVA products similar in molecular weight as the tubular EnBA copolymers in Examples 4 through 9. Comparative Example F represents a hot melt packaging formulation based on a low molecular weight polyethylene homopolymer. Note the superior elevated temperature performance of the tubular EnBA formulations (Examples 4–9) over the EVA-based comparative Example A, without the need to add a high melting wax. The wax also provides poorer low temperature performance. Examples 4–9 are also significantly more heat resistant (SAFT) than comparative EVA Examples D and E as well as comparative Example F. Comparative Example F also has poor low-temperature performance versus the Examples of this invention.

The results indicate that tubular EnBA copolymers retain the advantageous attributes of EnBA copolymers made in an autoclave (adhesion, stability, low temperature adhesion) while surprisingly improving the elevated temperature performance. These high MI tubular EnBA copolymers can be formulated for low application temperatures by one skilled in the art.

Example 13A

A further sample 13A was made with 50% by weight RESIN 3, 30% ESCOREZ 5600 and 20% Kaydol oil. This sample, as well as unformulated, low MW, tubular EnBA copolymer RESIN 3, was successfully sprayed using Nordson Corp. and ITW Dynatec spray applicators.

Examples 14–20

Resins 6–11

The procedure above describes preparation of Resins 1–5. Similar procedures and conditions were used to prepare Resins 6–11. In Resin 6, four-point injection was used. In Resins 7–11, three-point injection was used. In Resins 6–11, the monomer mixture included ethylene, n-butyl acrylate and vinyl acetate. The process conditions are shown in Table 9. The reactor throughput was 21.3–23.0 metric tons per hour.

TABLE 9

| | Resin No. | | | | |
|---|---|---|---|---|---|
| | 6 | 7 | 8 | 9 | 10 |
| Production Rate (lb/hr) | 13000 | 12590 | 12618 | 11546 | 11209 |
| Acetaldehyde Rate (lb/hr) | 116 | 104 | 108 | 90 | 93 |
| nBA Rate (lb/hr) | 2379 | 3010 | 3650 | 2025 | 2030 |
| VA Rate (lb/hr) | 1957 | 1140 | 840 | 1190 | 445 |
| Reactor Pressure (kpsig) | 36.0 | 36.0 | 36.0 | 36.0 | 36.0 |
| 1st Inlet Temperature (° F.) | 275 | 310 | 310 | 310 | 310 |
| 2nd Inlet Temperature (° F.) | 280 | 310 | 310 | 310 | 310 |
| 3rd Inlet Temperature (° F.) | 305 | 310 | 310 | 310 | 310 |
| 4th Inlet Temperature (° F.) | 325 | — | — | — | — |
| 1st Peak Temperature (° F.) | 435 | 430 | 430 | 430 | 430 |
| 2nd Peak Temperature (° F.) | 435 | 420 | 420 | 420 | 420 |
| 3rd Peak Temperature (° F.) | 410 | 420 | 420 | 420 | 420 |
| 4th Peak Temperature (° F.) | 395 | — | — | — | — |
| Initiator Consumption (gal/hr) | 20.5 | 18.0 | 20.8 | 16.0 | 16.5 |
| LPS Polymer Temp (° F.) | 240 | 246 | 246 | 210 | 255 |
| LPS Pressure (psi) | 13 | 12.9 | 12.0 | 12.0 | 12.5 |
| HPS Polymer Temperature (° F.) | 305 | 314 | 314 | 311 | 311 |
| HPS Pressure (kpsig) | 3935 | 3960 | 3960 | 3875 | 3850 |
| Pack-out Viscosity (cp) | 2,805 | 2,785 | 2,535 | 2,820 | 2,685 |
| nBA (wt %) by NMR | 17.77 | 23.90 | 28.92 | 17.53 | 18.10 |
| VA (wt %) by NMR | 9.66 | 6.50 | 3.88 | 6.95 | 3.93 |

In Resins 6–11, copolymers of ethylene, n-butylacrylate, and vinyl acetate were prepared using the method described above. Properties of these inventive copolymers are shown in Table 10. Note that all of the DSC measurements of the copolymers were made according to Method 2 as described above.

TABLE 10

Properties of Tubular EnBAVA Copolymers

| | Resin No. | | | | |
|---|---|---|---|---|---|
| | 6 | 7 | 8 | 9 | 10 |
| Melt Viscosity (mPa · s at 190° C.) | 2805 | 2785 | 2535 | 2820 | 2685 |
| Density (g/cm$^3$) | 0.9413 | 0.9400 | 0.9400 | 0.9398 | 0.9392 |
| nBA (mol %)[a] | 4.92 | 6.74 | 8.57 | 4.90 | 4.76 |
| nBA (wt %)[b] | 17.83 | 23.74 | 29.24 | 18.04 | 18.1 |
| VA (mol %) | 4.10 | 2.75 | 1.63 | 3.25 | 1.54 |
| VA (wt %) | 9.99 | 6.52 | 3.73 | 8.04 | 3.93 |

TABLE 10-continued

Properties of Tubular EnBAVA Copolymers

| | Resin No. | | | | |
|---|---|---|---|---|---|
| | 6 | 7 | 8 | 9 | 10 |
| Total Comonomer Content (mol %) | 9.02 | 9.49 | 10.2 | 8.15 | 6.3 |
| DSC Melting Peak(s) | 96.15[c] | 99.86[c] | 104.7 | 99.66[c] | 106.8 |
| (° C.) | 92.15 | 95.71 | 99.78 | 95.37 | 102.1 |
| | 67.16 | 72.42 | 79.77 | 74.21 | 83.1 |
| DSC Crystallization Peak(s) (° C.) | 76.88 | 81.62 | 87.04 | 81.79 | 89.06 |
| Heat of Melting (J/g) | 72.8 | 66.0 | 54.5 | 81.6 | 93.7 |
| Heat of Fusion (J/g) | −91.9 | −80.9 | −74.5 | −93.8 | −109.6 |
| % Melted at 60° C. | 43.9 | 40.5 | 35.1 | 41.3 | 31.9 |
| T at 50% Melted (° C.) | 65.9 | 69.5 | 75.4 | 68.4 | 78.9 |
| T at 80% Melted (° C.) | 91.2 | 94.7 | 98.9 | 94.0 | 101.7 |
| T at 100% Melted (° C.) | 104.1 | 107.3 | 110.4 | 106.3 | 112.2 |
| Vicat SP at 200 g load (° C.) | 53.0 | 50.9 | 44.1 | 57.3 | 69.5 |

[a]Calculated from corresponding weight percent comonomer values.
[b]by FTIR
[c]Shoulder on high temperature side of primary melting peak.

Table 10 lists the physical properties of copolymer of ethylene, n-butylacrylate, and vinyl acetate (EnBAVA) make on a tubular reactor. Vinyl acetate monomer was used to minimize the very high melting peaks found in the tubular EnBA copolymers shown in Table 1. Presence of this very high melting portion, presumably polyethylene homopolymer, can result in some phase separation of the tubular EnBA polymer and/or corresponding adhesive formulations at elevated temperature. The EnBAVA copolymers have lower melting peaks and shoulders than tubular EnBA copolymers of similar total comonomer content. Again, the tubular EnBAVA copolymers have superior elevated temperature performance (SAFT) than Comparative Examples A–C (Table 7) while maintaining the good low temperature properties of the autoclave-produced EnBA counterparts.

TABLE 11

Adhesive Compositions 14–20

| | 14 | 15 | 16 | 17 | 18 | 19 | 20 |
|---|---|---|---|---|---|---|---|
| Resin 6 | 60 | — | — | — | — | 60 | 60 |
| Resin 7 | — | 60 | — | — | — | — | — |
| Resin 8 | — | — | 60 | — | — | — | — |
| Resin 9 | — | — | — | 60 | — | — | — |
| Resin 10 | — | — | — | — | 60 | — | — |
| ESCOREZ 2596 | — | — | — | — | — | 40 | — |
| ESCOREZ 5600 | 40 | 40 | 40 | 40 | 40 | — | — |
| SYLVALITE RE 100 | — | — | — | — | — | — | 40 |
| IRGANOX 1010 | 0.25 | 0.25 | 0.25 | 0.25 | 0.25 | 0.25 | 0.25 |

As shown in table 12, many other tackifier compositions can be used to formulated EnBAVA copolymer adhesive systems. Tall Oil Rosen Esters give good adhesion properties but the adhesive itself remains cloudy over a broad temperature range.

TABLE 14

Adhesive Properties of EnBAVA Copolymers

| Adhesive Properties | 14 | 15 | 16 | 17 | 18 | 19 | 20 |
|---|---|---|---|---|---|---|---|
| Melt Viscosity (MPa · s) | | | | | | | |
| 180° C. | 1240 | 1210 | 1120 | 1290 | 1215 | 1010 | 1140 |
| 160° C. | 2080 | 2060 | 1890 | 2155 | 2015 | 1687 | 1940 |
| 140° C. | 3770 | 3820 | 3400 | 3885 | 3590 | 3100 | 3560 |
| 120° C. | 7712 | 7875 | 7000 | 7875 | 7225 | 6387 | 7550 |
| SAFT (° C.) | 80 | 81.7 | 80.6 | 86.7 | 91.7 | 83.3 | 81.1 |
| Cloud Point (° C.) | 95 | 140 | 160 | 95 | 102 | 115 | 200+ |
| Peel to Aluminum (pli)* (N · m) | 0.5 | 3.2 | 1.27 | 2.4 | 2.6 | 0.5 | 7.4 |
| Peel to Polyethylene (pli)* (N · m) | 7.2 | 4.7 | 2.9 | 6.3 | 6.0 | 2.2 | 7.6 |

TABLE 14-continued

Adhesive Properties of EnBAVA Copolymers

| Adhesive Properties | 14 | 15 | 16 | 17 | 18 | 19 | 20 |
|---|---|---|---|---|---|---|---|
| Peel to Kraft paper (% Fiber Tear at T) | | | | | | | |
| 24° C. | SF | SF | SF | SF | SF | SF | SF |
| −11° C. | SF | SF | SF | SF | SF | SF | SF |

While certain representative embodiments and details have been shown to illustrate the invention, it will be apparent to skilled artisans that various process and product changes from those disclosed in this application may be made without departing from this invention's scope, which the appended claims define.

All cited patents, test procedures, priority documents, and other cited documents are fully incorporated by reference to the extent that this material is consistent with this specification and for all jurisdictions in which such incorporation is permitted.

Certain features of the present invention are described in terms of a set of numerical upper limits and a set of numerical lower limits. This specification discloses all ranges formed by any combination of these limits. All combinations of these limits are within the scope of the invention unless otherwise indicated.

What is claimed is:

1. A hot melt adhesive composition comprising a tubular reactor copolymer of ethylene and at least 5 mol % of comonomer units derived from alkyl acrylates, alkyl methacrylates, or mixtures thereof, wherein the copolymer has:
    (a) a melt index of from 300–10,000 g/10 min;
    (b) a maximum peak melting temperature of at least 100° C.; and
    (c) a temperature required to melt 50% of the copolymer of at least 80° C.

2. The hot melt adhesive composition of claim 1, wherein the alkyl group of the alkyl acrylate or alkyl methacrylate is a linear or branched $C_1$ to $C_{12}$ group.

3. The hot melt adhesive composition of claim 1, wherein the alkyl acrylate is selected from the group consisting of methyl acrylate, ethyl acrylate, n-butyl acrylate, iso-butyl acrylate, t-butyl acrylate, n-hexyl acrylate, 2-ethylbutyl acrylate, and 2-ethylhexyl acrylate.

4. The hot melt adhesive composition of claim 1, wherein the alkyl acrylate is n-butyl acrylate.

5. The hot melt adhesive composition of claim 1, further comprising a tackifier, and wherein said tackifier is present in an amount of from 5 to 60 percent by weight, based on the total weight of the composition.

6. The hot melt adhesive composition of claim 1, wherein the composition has a shear adhesion fail temperature of at least 80° C.

7. The hot melt adhesive composition of claim 1, wherein the composition has an adhesive melt viscosity of less than 2200 cps at 180° C. as measured by ASTM D-3236.

8. The hot melt adhesive composition of claim 1, further comprising a wax.

9. A hot melt adhesive composition comprising a tubular reactor copolymer of ethylene and at least 5 mol % comonomer, the comonomer comprising a first comonomer component comprising an alkyl acrylate, an alkyl methacrylate or a mixture thereof; and a second comonomer component comprising a compound having a reactivity ratio $r_2$ of 2 or less relative to ethylene, wherein the copolymer has:
    (a) a melt index of from 300 to 10,000 g/10 min;
    (b) a maximum peak melting temperature of at least 80° C.; and
    (c) a temperature required to melt 50% of the copolymer of at least 40° C.

10. The hot melt adhesive composition of claim 9, further comprising a plasticizer, an antioxidant, a pigment, or a mixture thereof.

11. The hot melt adhesive composition of claim 4, having at least 5 mol % of n-butyl acrylate derived units, and from 5 to 60% by weight of a compatible tackifier, based on the total weight of the composition.

12. The hot melt adhesive composition of claim 11, wherein the copolymer comprises 6 to 14 mol % n-butyl acrylate derived units.

13. The hot melt adhesive composition of claim 11, wherein the composition has an adhesive melt viscosity of less than 1500 cps at 180° C. as measured by ASTM D-3236.

14. The hot melt adhesive composition of claim 11, further comprising a wax.

15. The hot melt adhesive composition of claim 11, wherein the copolymer is a copolymer of ethylene, n-butyl acrylate, and at least one additional comonomer selected from the group consisting of C1 to C12 alkyl acrylates, C1 to C12 alkyl methacrylates, vinyl acetate, acrylic acid, methacrylic acid, partial esters of maleic acid, and carbon monoxide.

16. The hot melt adhesive composition of claim 11, further comprising a plasticizer, an antioxidant, a pigment, or a mixture thereof.

17. An article comprising a first surface and a second surface, wherein at least a portion of the second surface is adhered to at least a portion of the first surface by the hot melt adhesive composition of claim 1.

18. The article of claim 17, wherein the article is a bookbinding, a product assembly, a disposable article, a case, a carton or a tray.

19. A glue stick comprising the hot melt adhesive composition of claim 1.

* * * * *